US012726396B2

(12) United States Patent
Yang

(10) Patent No.: US 12,726,396 B2
(45) Date of Patent: Sep. 1, 2026

(54) DIGITAL PREDISTORTION METHOD AND APPARATUS

(71) Applicant: ZTE CORPORATION, Shenzhen (CN)

(72) Inventor: Zhen Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 4 days.

(21) Appl. No.: 18/862,059

(22) PCT Filed: May 31, 2022

(86) PCT No.: PCT/CN2022/096171

§ 371 (c)(1),
(2) Date: Oct. 31, 2024

(87) PCT Pub. No.: WO2023/230819

PCT Pub. Date: Dec. 7, 2023

(65) Prior Publication Data

US 2025/0184207 A1 Jun. 5, 2025

(51) Int. Cl.
*H04L 27/36* (2006.01)
*H04W 24/02* (2009.01)

(52) U.S. Cl.
CPC .......... *H04L 27/367* (2013.01); *H04W 24/02* (2013.01)

(58) Field of Classification Search
CPC ................ H04L 27/367; H04W 24/02; H04B 2001/0425; H04B 1/0475; G06N 3/048; G06N 3/049; G06N 3/084; H03F 3/19; H03F 3/245; H03F 2201/3224; H03F 1/3241
See application file for complete search history.

(56) References Cited

U.S. PATENT DOCUMENTS

| | | | | |
|---|---|---|---|---|
| 8,013,676 | B2 * | 9/2011 | Su | H03F 1/3247 330/99 |
| 10,673,475 | B1 * | 6/2020 | Zhuo | H04B 7/0617 |
| 10,972,139 | B1 | 4/2021 | Luo | |
| 12,047,222 | B2 * | 7/2024 | Chen | H04B 1/30 |
| 12,199,650 | B2 * | 1/2025 | Luo | G06N 3/044 |
| 12,368,459 | B2 * | 7/2025 | He | H03F 1/3241 |
| 2003/0053552 | A1 * | 3/2003 | Hongo | H03F 1/3252 375/295 |

(Continued)

FOREIGN PATENT DOCUMENTS

| | | | |
|---|---|---|---|
| CN | 111245375 | A | 6/2020 |
| CN | 113676426 | A | 11/2021 |

OTHER PUBLICATIONS

PCT International Search Report and Written Opinion for corresponding PCT Application No. PCT/CN2022/096171, mailed Dec. 16, 2022, 8 pages.

(Continued)

*Primary Examiner* — Jean B Corrielus

(74) *Attorney, Agent, or Firm* — Dority & Manning, P.A.

(57) ABSTRACT

Systems, methods and apparatus for processing signals are described. The method includes determining a predistortion signal corresponding to an input signal by processing the input signal through a multi-stage predistortion model that is based on neural network processing and generating a transmission waveform by processing the predistortion signal through transmission electronics.

19 Claims, 14 Drawing Sheets

(56) References Cited

U.S. PATENT DOCUMENTS

| | | | | |
|---|---|---|---|---|
| 2005/0140438 | A1* | 6/2005 | Jin | H03F 1/3241 330/149 |
| 2010/0253426 | A1* | 10/2010 | Su | H03F 1/02 330/149 |
| 2014/0348263 | A1* | 11/2014 | Rollins | H03F 3/24 375/296 |
| 2021/0409079 | A1 | 12/2021 | Ghannouchi et al. | |
| 2022/0385317 | A1* | 12/2022 | Jung | H03F 3/68 |
| 2023/0033203 | A1 | 2/2023 | Liu et al. | |
| 2023/0268942 | A1* | 8/2023 | Ghannouchi | H04B 1/0475 375/297 |
| 2023/0275788 | A1* | 8/2023 | Tanio | H04B 1/0475 375/262 |

OTHER PUBLICATIONS

Roslowski et al., "Experimental Evaluation of PA Digital Predistortion Based on Simple Feedforward Neural Network", 2020 23rd International Microwave and Radar Conference (MIKON), Warsaw, Poland, Oct. 5-8, 2020, pp. 293-296.

Yu, "A Generalized Digital Predistortion Model Based on Artificial Neural Networks", 2018 Asia-Pacific Microwave Conference (APMC), Kyoto, Japan, Nov. 6-9, 2018, pp. 935-937.

Wang et al., "Augmented Real-Valued Time-Delay Neural Network for Compensation of Distortions and Impairments in Wireless Transmitters", IEEE Transactions on Neural Networks and Learning Systems, vol. 30, No. 1, Jan. 2019, 13 pages.

Luo, et al., "Linearization Angle Widened Digital Predistortion for 5G MIMO Beamforming Transmitters", IEEE Transactions on Microwave Theory and Techniques, vol. 69, No. 11, Nov. 2021, pp. 5008-5020.

3rd Generation Partnership Project, "AI: 8.1.5 Discussion on impact of cross-talk on UL performance" TSG RAN WG1 #107-e, R1-2110997, e-Meeting, Nov. 11-19, 2021, 9 pages.

3rd Generation Partnership Project, "Overview of evaluation on NR duplex evolution", TSG RAN WG1 Meeting #109e, R1-2203156, e-Meeting, May 9-20, 2022, 28 pages.

3rd Generation Partnership Project, "Discussions on network energy saving techniques", TSG RAN WG1 #109-e, R1-2203576, e-Meeting, May 9-20, 2022, 8 pages.

3rd Generation Partnership Project, "Evaluation of NR duplex evolution", TSG-RAN WG1 Meeting #109-e, R1-2204106, e-Meeting, May 9-20, 2022, 40 pages.

3rd Generation Partnership Project, "Inputs needed from RAN4 to facilitate RAN1 study", TSG-RAN WG1 Meeting #109-e, R1-2204109, e-Meeting, May 9-20, 2022, 12 pages.

3rd Generation Partnership Project, "Discussion on Network Energy Saving Techniques", TSG-RAN WG1 Meeting #109-e, R1-2204812, e-Meeting, May 9-20, 2022, 7 pages.

3rd Generation Partnership Project, "Network energy saving techniques", TSG-RAN WG1 Meeting #109-e, R1-2205046, e-Meeting, May 9-20, 2022, 19 pages.

Extended European Search Report for corresponding Application No. EP 22944159.7, dated Dec. 5, 2025, 89 pages.

* cited by examiner

DIGITAL PREDISTORTION METHOD AND APPARATUS

CROSS-REFERENCE TO RELATED APPLICATION(S)

This application is a national phase entry under 35 USC 371 of International Patent Application No. PCT/CN2022/096171 filed on May 31, 2022, and the entire contents of the International Patent Application are incorporated into this application by reference.

TECHNICAL FIELD

This document is directed generally to electronic signal processing.

BACKGROUND

Presently, implementations of data communication devices perform various signal processing functions for tasks such as receiving or transmitting signals. The processing typically uses a combination of analog and digital signal processing functions that are performed using various electronic components. Physical limitations of the electronic components introduce undesirable signal distortions.

SUMMARY

This document relates to methods, systems, and devices for mitigating signal distortions in a signal processing system.

In one example aspect, a method of processing signals is disclosed. The method includes determining a predistortion signal corresponding to an input signal by processing the input signal through a multi-stage predistortion model that is based on neural network processing and generating a transmission waveform by processing the predistortion signal through transmission electronics.

In another aspect, a wireless communication apparatus that is configured or operable to perform the above-described methods is disclosed. The apparatus may include a processor.

In another aspect, a computer-readable medium is disclosed. The computer-readable medium stores processor-executable code that, upon execution, causes a processor to implement a method described in the present document.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section.

Initial Discussion

A radio frequency (RF) power amplifier is an important component in the wireless communication system. Its function is to amplify the power of a wireless signal to a target power value and then feed it into an antenna for transmission. RF power amplifiers typically have two characteristics, memory and nonlinearity. The nonlinearity is mainly manifested in that the gain of the power amplifier to the input signal gradually decreases with the increase of the input signal power. Nonlinearity can distort the constellation of the signal, especially for high peak to average power ratio (PAPR) signals such as orthogonal frequency division multiplexing OFDM signals commonly used in most present-day communication systems. The memory characteristic refers to a power amplifier's behavior that the output of the power amplifier is not only related to the input at the current moment, but also related to the input signal at one or more previous moments. The influence of memory is often correlated to the bandwidth of the signal. The larger the bandwidth of the signal, the greater the influence of memory, and the more it cannot be ignored by implementors.

Figure 1:
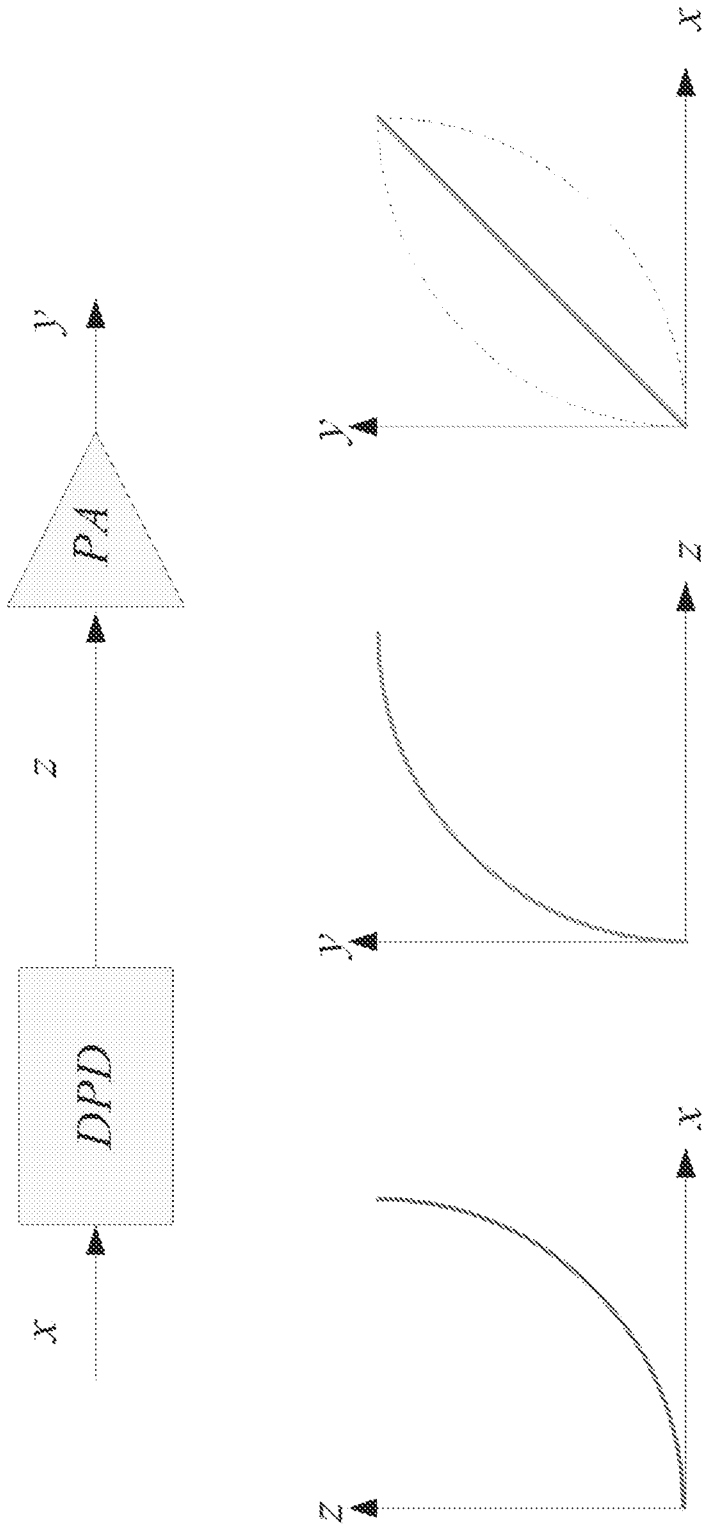
FIG. 1 shows an example schematic diagram of a digital predistortion (DPD) function.

At present, one popular solution to solve the problem of nonlinearity and memory of power amplifier is to use digital pre-distortion, DPD. The principle is to add a DPD module before the power amplifier module, as shown in FIG. 1. The DPD module is designed to also have a non-linearity and a memory (e.g., left graph in FIG. 1). During operation, the DPD module and the power amplifier module are cascaded together, such that the non-linearity and memory of the two modules cancel each other out, and finally achieve the effect of linear amplification of the original signal. For example, the output signal y depicted in FIG. 1 will be approximately a linear function of the input signal x, as depicted by the three graphs in FIG. 1. The input signal x may be, for example, a digital representation of a signal that a transmitting device intends to transmit.

DPD technology has been widely used in wireless communication systems, among which MP (memory polynomial) and GMP (generalized memory polynomial) are the most commonly used DPD models. With the development of wireless communication technology, the bandwidth of the signal is getting larger and larger, and the operator's requirements for energy saving and consumption reduction of the base station are getting higher and higher. Performance of a DPD module is limited by the model itself, and it is difficult to improve the performance if the model is inadequate to take into account non-linearity of the PA module.

In some embodiments proposed in the present document, the DPD functionality leverages the recent developments in artificial intelligence. As further described in the present document, neural networks may be used for design and operation of the DPD module because a neural network has the ability to provide excellent nonlinear fitting capabilities. Two types of models may be used, shown in FIGS. 2 and 3 respectively.

Figure 2:
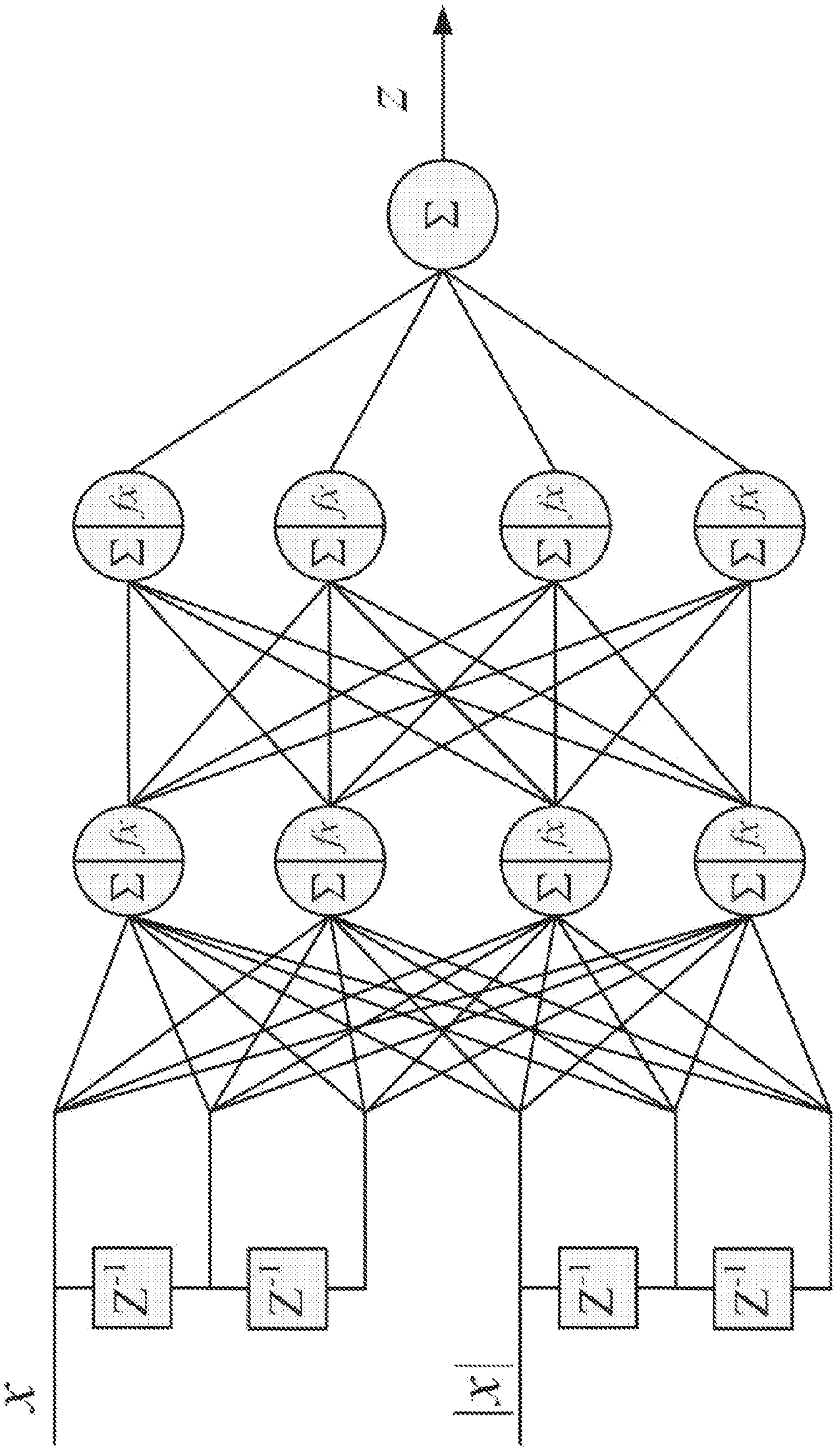
FIG. 2 shows an example of a DPD model 1 based on a neural network implementation.

The model in FIG. 2 is a neural network in a general sense, but it is applied to the DPD field. Here, an input signal x, and its delayed versions (Z−1 represents a unit delay) and a modulus of the input signal x and its delayed versions may be used for training a neural network that outputs the signal z that is then subsequently fed into the PA to obtain the desired output signal y.

Figure 3:
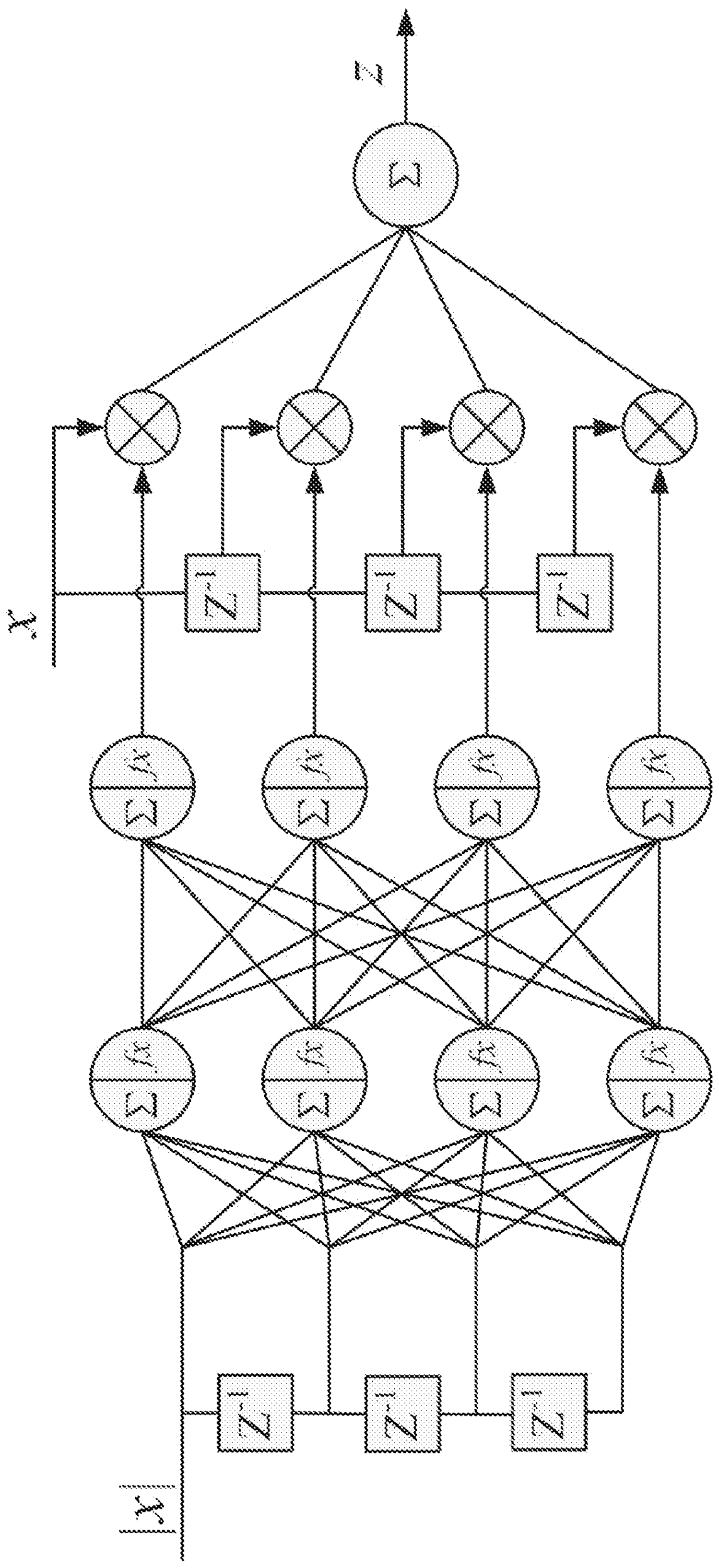
FIG. 3 shows an example of a DPD model 2 based on a neural network implementation.

FIG. 3 considers some features of a traditional DPD model on the basis of a general neural network. In particular, the parameters input to the model used in FIG. 3 include modulus of the input signal and its delayed versions that are multiplicatively combined with the input signal and its delayed versions to obtain the signal z.

One shortcoming of the present day DPD schemes is that the selection of models and DPD schemes has to be customized based on details of the subsequent PA state used in an implementation. To put this differently, if a same DPD model is used for different power amplifiers presently available, the pre-distortion performance may vary because different power amplifiers exhibit different non-linear behaviors that may not be effectively compensated by a single DPD model. Accurate modeling of distortion characteristics of RF power amplifiers is very complex, and there are also great differences between different types and different batches of power amplifier components even from a same manufacturer. Some DPD models are very well matched with a certain type of power amplifier, but the results of changing another type of power amplifier may be completely opposite.

The present document discloses a multi-stage DPD technique in which a cascade of modules that are trained using neural network are used to achieve a DPD performance that is ubiquitously applicable to many different types of PA. In some embodiments, different DPD models are combined into a single model, which provides a flexibility of modeling of PA characteristics that is not available in present day implementations. As disclosed in the present document, the DPD technique is able to provide satisfactory pre-distortion compensation for a wide range of power amplifiers and also for wide bandwidths beyond what is typically supported by today's implementations. At the same time, there is no significant increase in the computational complexity due to the cascading of multiple stages.

These, and other, advantages and features are described throughout the present document.

EMBODIMENT EXAMPLES

In some embodiments, a cascade arrangement of neural network implementations, each implementing a different DPD model that is trained during operation, may be implemented. The units or modules used in the arrangement may implement, for example, some existing DPD models. The selective use of improvements resulting from one neural network model is thus used to train another neural network model, which shows a significant improvement in the performance of the overall arrangement.

Example Embodiment 1 (Case 1)

Figure 4:
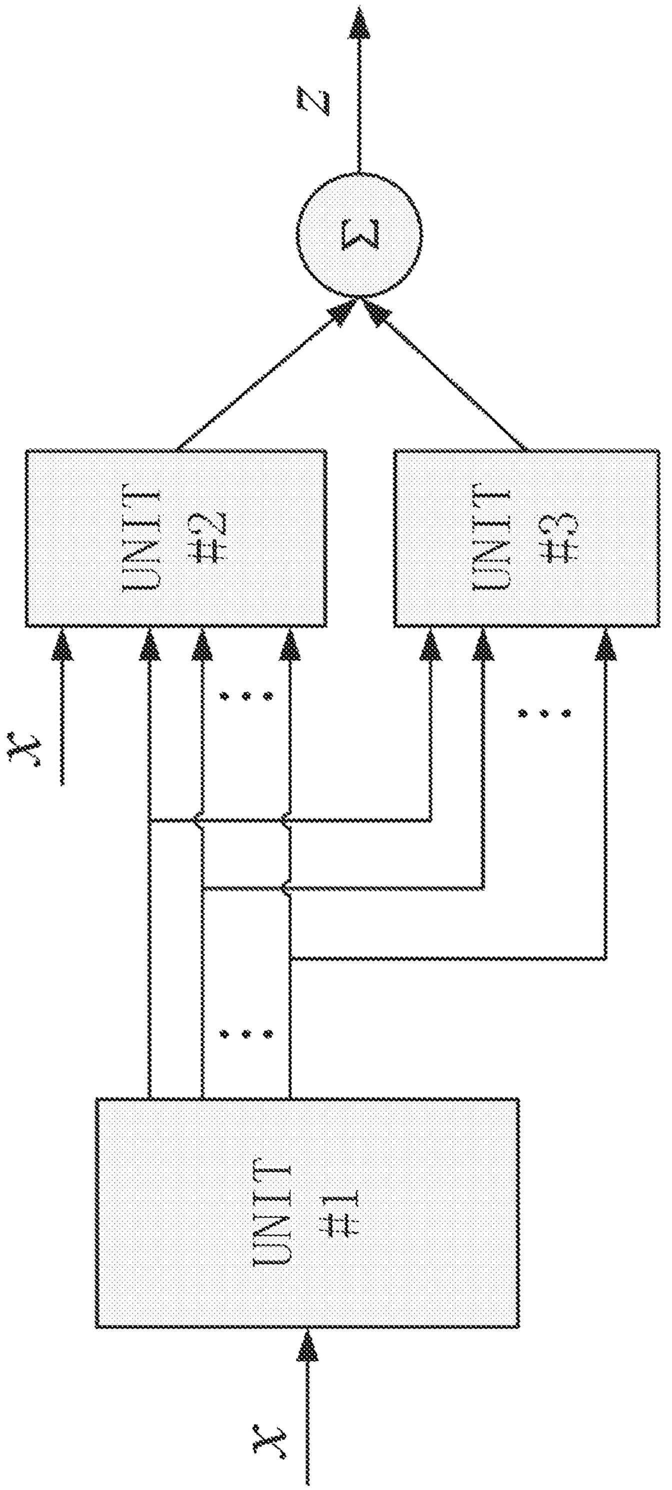
FIG. 4 shows an example embodiment of a DPD function.

The structure of the DPD module proposed in the present document is shown in FIG. 4, where x is the input of the DPD module, z is the output of the DPD module, x and z are complex numbers. Some additional features may include:

1) The DPD module includes 3 independent computing units, unit #1, unit #2, unit #3 and other necessary components (omitted from the drawings for clarity).
2) The input to unit #1 is x.
3) The input of unit #2 is the output of x and unit #1.
4) The input of unit #3 is the output of unit #1.
5) The output of the DPD module z is the output of unit #2 plus the output of unit #3.

One possible structure for unit #1 is described in case 3, one possible structure for unit #2 is described in case 5, and one possible structure for unit #3 is described in case 6. Thus, the combination of unit #1 and unit #2 is equivalent to the neural network-based DPD model 2 in FIG. 3, and the combination of unit #1 and unit #3 is equivalent to the neural network-based DPD model 1 in FIG. 2. In this way, two different DPD models are organically combined, so that the new model combines the advantages of the two models while avoiding the disadvantages of each.

In some embodiments, unit #2 and unit #3 share the output of unit #1, and through this sharing instead of simply stacking model 1 and model 2 together, the number of model parameters is greatly reduced, reducing the model implementation and thus the complexity.

Example Embodiment 2 (Case 2)

Figure 5:
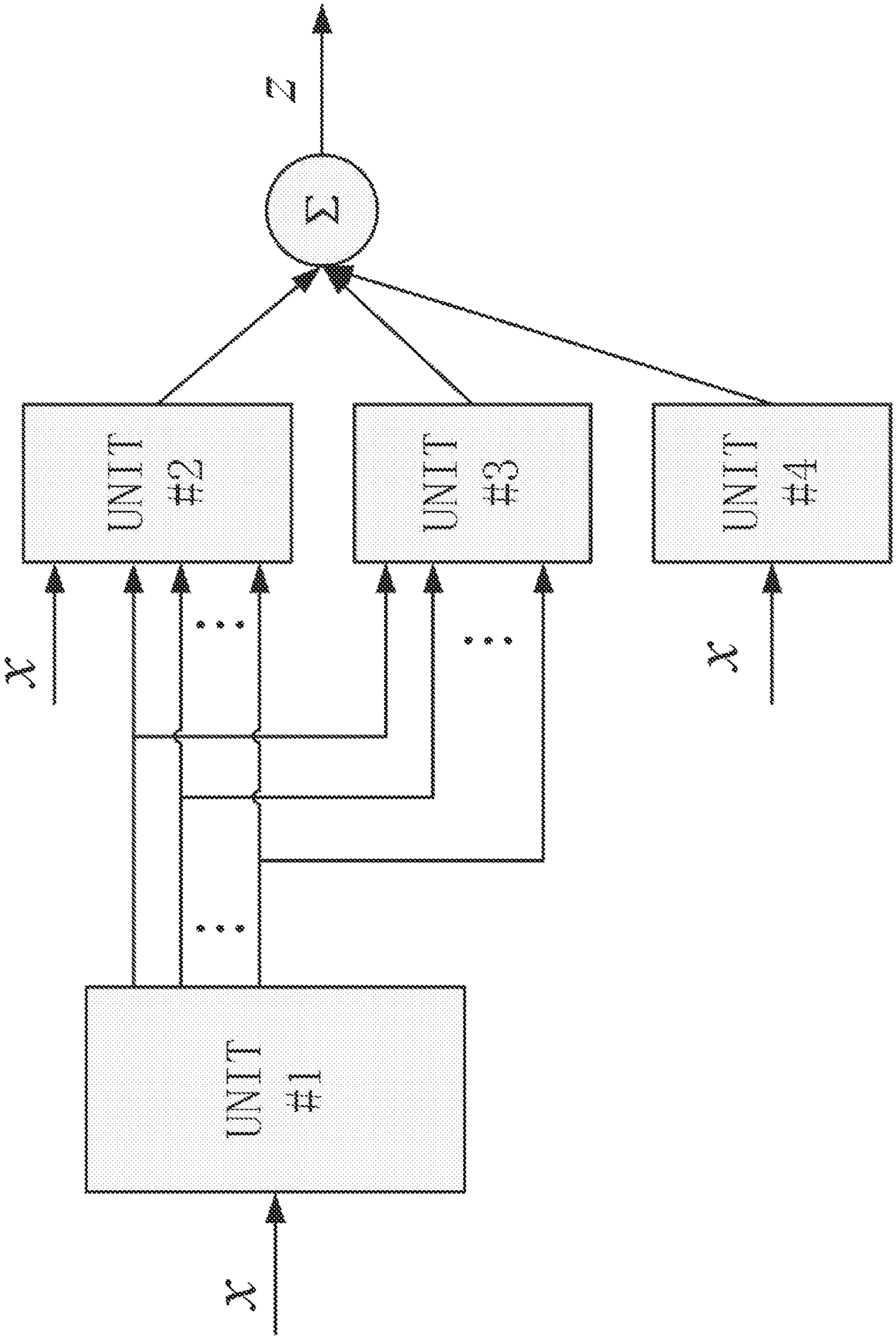
FIG. 5 shows an example embodiment of another DPD function.

Case 2 adds unit #4 on the basis of case 1, the input of unit #4 is x, the output z of the DPD module is the output of unit #2, the output of unit #3 and the output of unit #4 are superimposed. This is depicted in FIG. 5.

Figure 11:
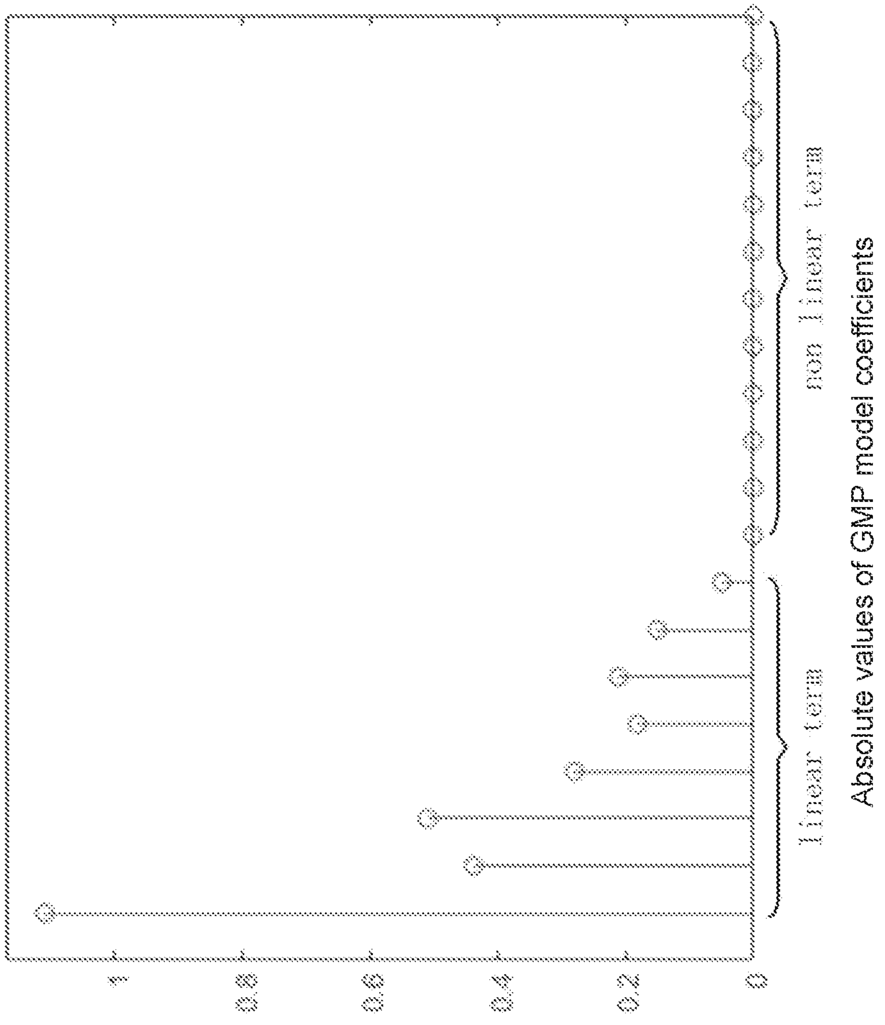
FIG. 11 is a graphical example of coefficients used in an implementation of a DPD function.

An optional structure for cell #4 is a linear model, as described in case 8, the output of cell #4 is a linearly weighted sum of x and its history terms. One rationale of design unit #4 is that although the RF power amplifier has nonlinear characteristics, in fact, the power amplifier still has strong linear characteristics. Both the MP model and the GMP model contain linear components, and the coefficients of the linear terms are much larger than those of the non-linear ones. One example of the coefficients of the linear term is shown in FIG. 11.

Although a neural network may be used to fit the nonlinear part of the DPD data, using a neural network to fit the linear part provides greater flexibility and accuracy. Adding a linear part to the mixed model enables the neural network part in the mixed model to focus more on fitting nonlinear parts, reducing the difficulty of neural network training.

Example Embodiment 3 (Case 3)

Figure 6:
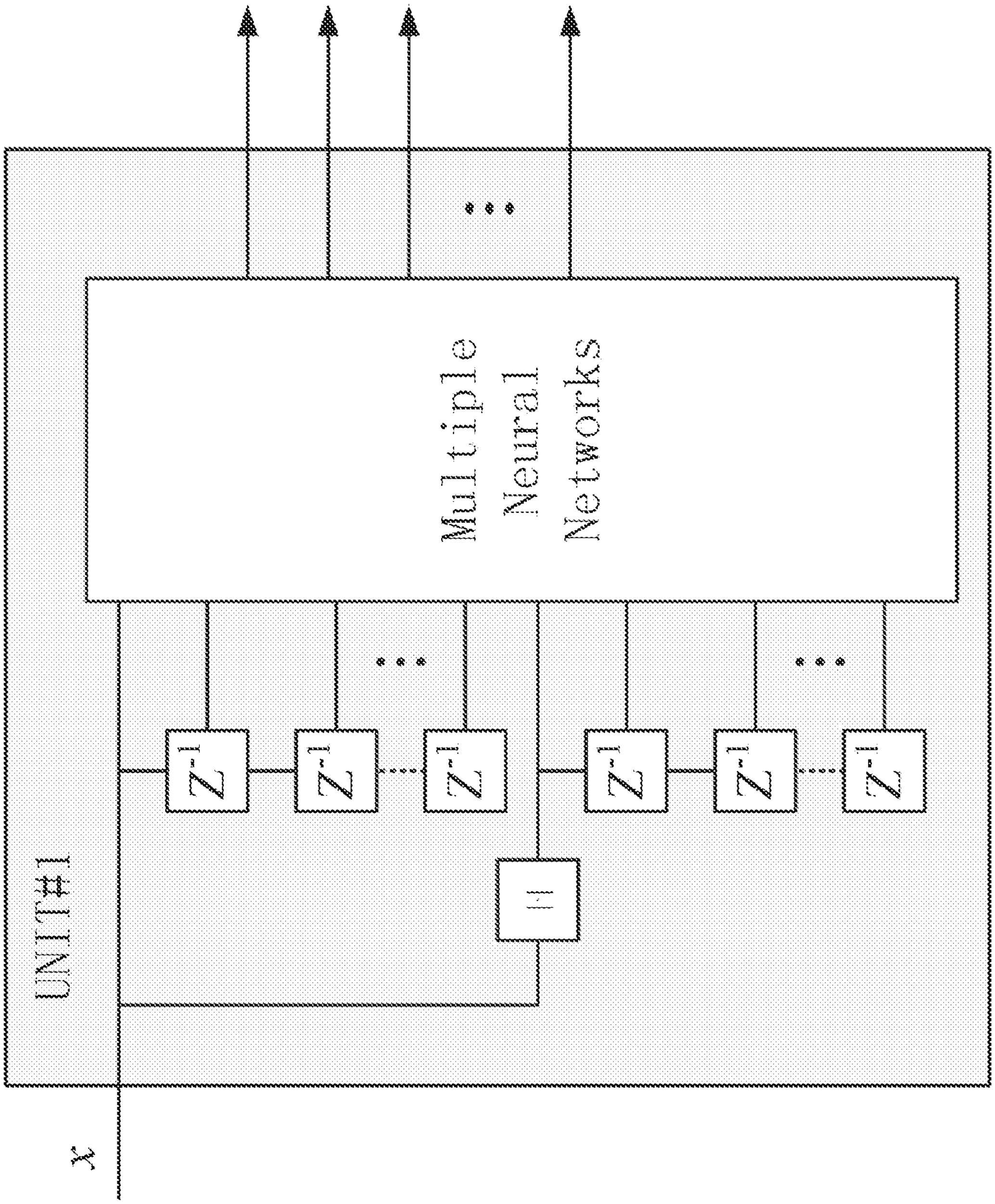
FIG. 6 shows an example implementation of a portion of a DPD function.

An optional structure in Unit #1 is shown in FIG. 6 and consists of a complex neural network and other necessary components.

1) |•| in FIG. 6 represents the modulo of complex numbers.
2) The complex neural network module in FIG. 6 is a fully connected complex neural network, and its input, output and all parameters are complex.
3) The complex neural network module in FIG. 6 contains at least one hidden layer.
4) The activation function of the hidden layer of the complex neural network in FIG. 6 is a split hyperbolic tangent activation function represented as:

$$f(x)=\tanh(\mathrm{Re}(x))+i\cdot\tanh(\mathrm{Im}(x)).$$

Example Embodiment 4 (Case 4)

Figure 7:
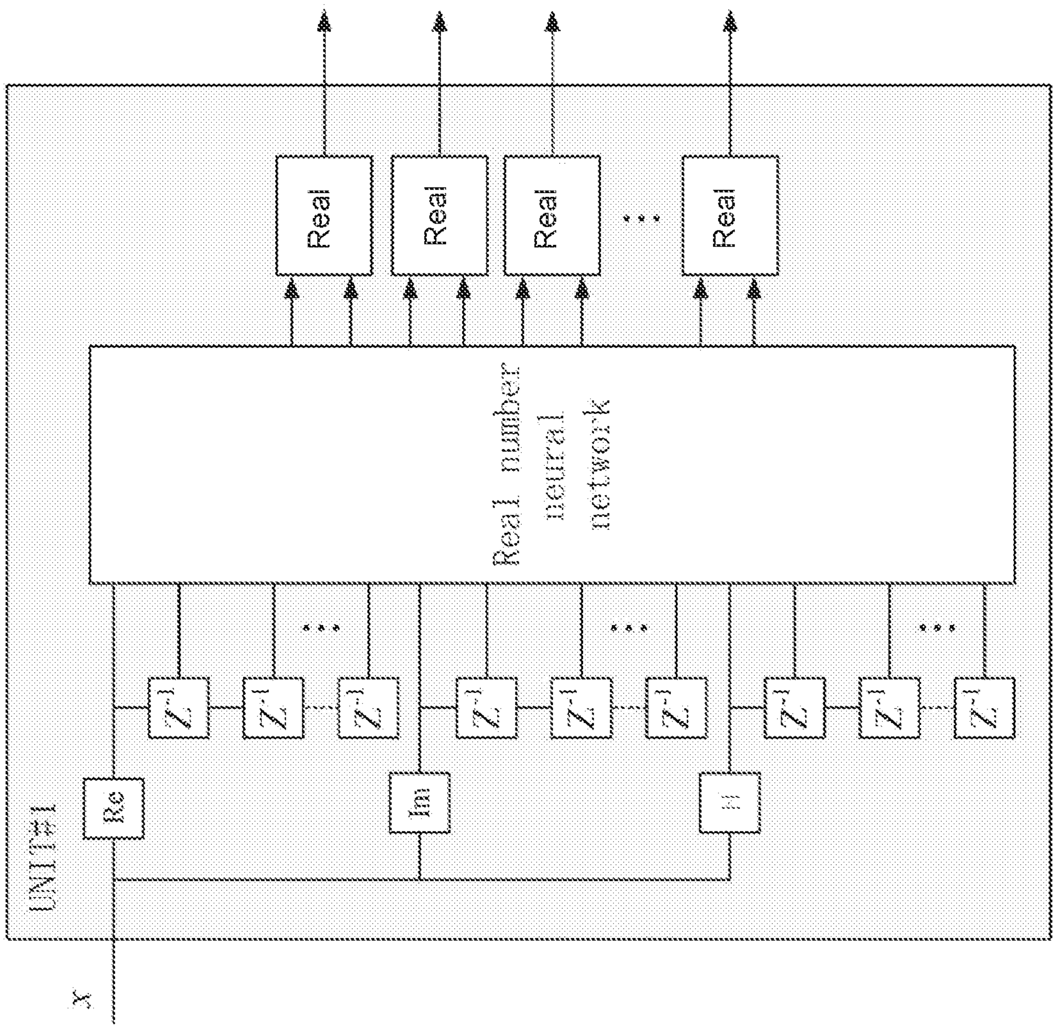
FIG. 7 shows an example implementation of a DPD function in which a real neural network is used.

An optional structure for compute unit #1 in case 1 is shown in FIG. 7 and consists of a real neural network and other necessary components.

1) The real number neural network module in FIG. 7 is a fully connected real number neural network, and its input, output and all parameters are real numbers.
2) The real number neural network module in FIG. 7 contains at least one hidden layer.
3) The activation function of the hidden layer of the real neural network in FIG. 7 may be a hyperbolic tangent activation function represented as:

$$f(x) = \tanh(x).$$

Example Embodiment 5 (Case 5)

Figure 8:
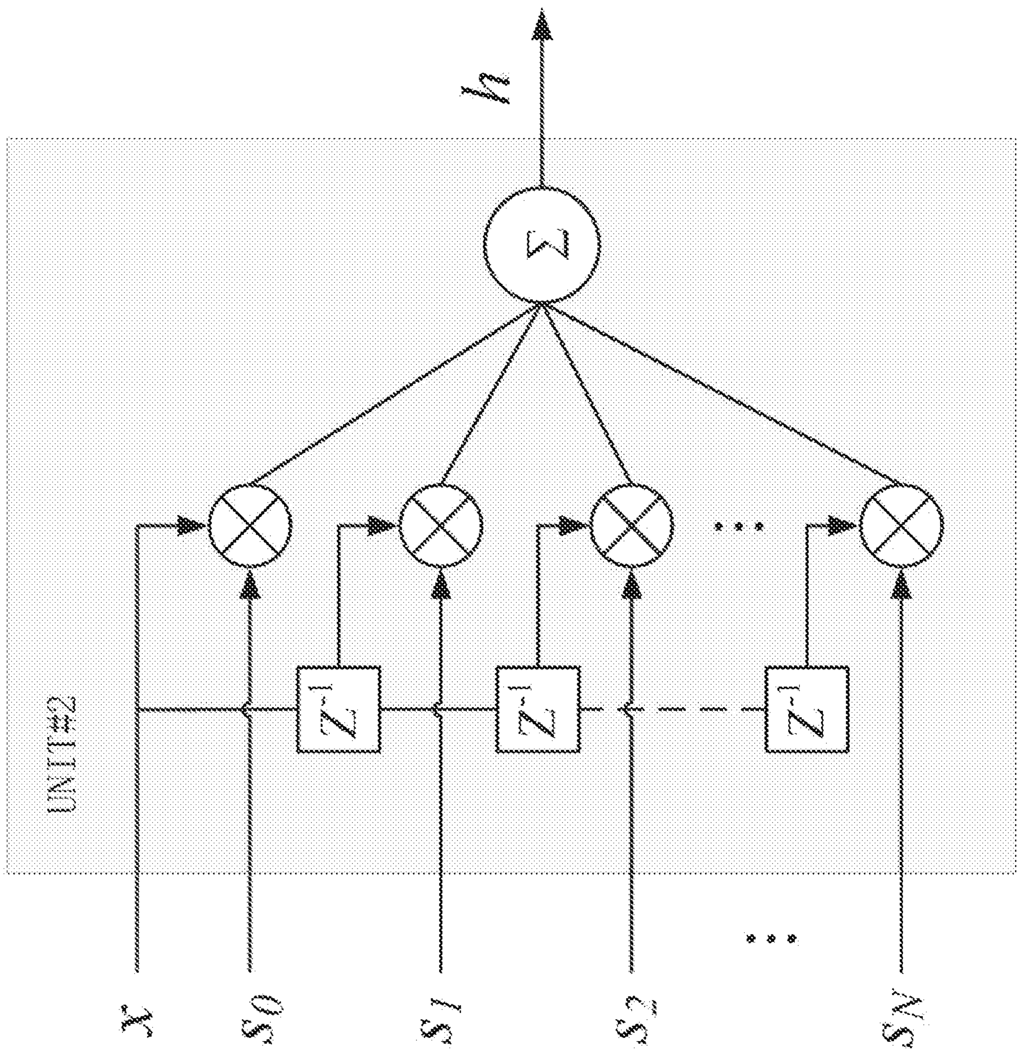
FIG. 8 shows an example implementation of a portion of a DPD function.

An optional structure of calculation unit #2 in case 1 is shown in FIG. 8.

1) The output of unit #1 is represented as $s_0, s_1, \ldots, s_N$.
2) The input-output relationship of the module is:

$$h(n) = \sum_{i=0}^{N} s_i x(n-i).$$

Example Embodiment 6 (Case 6)

Figure 9:
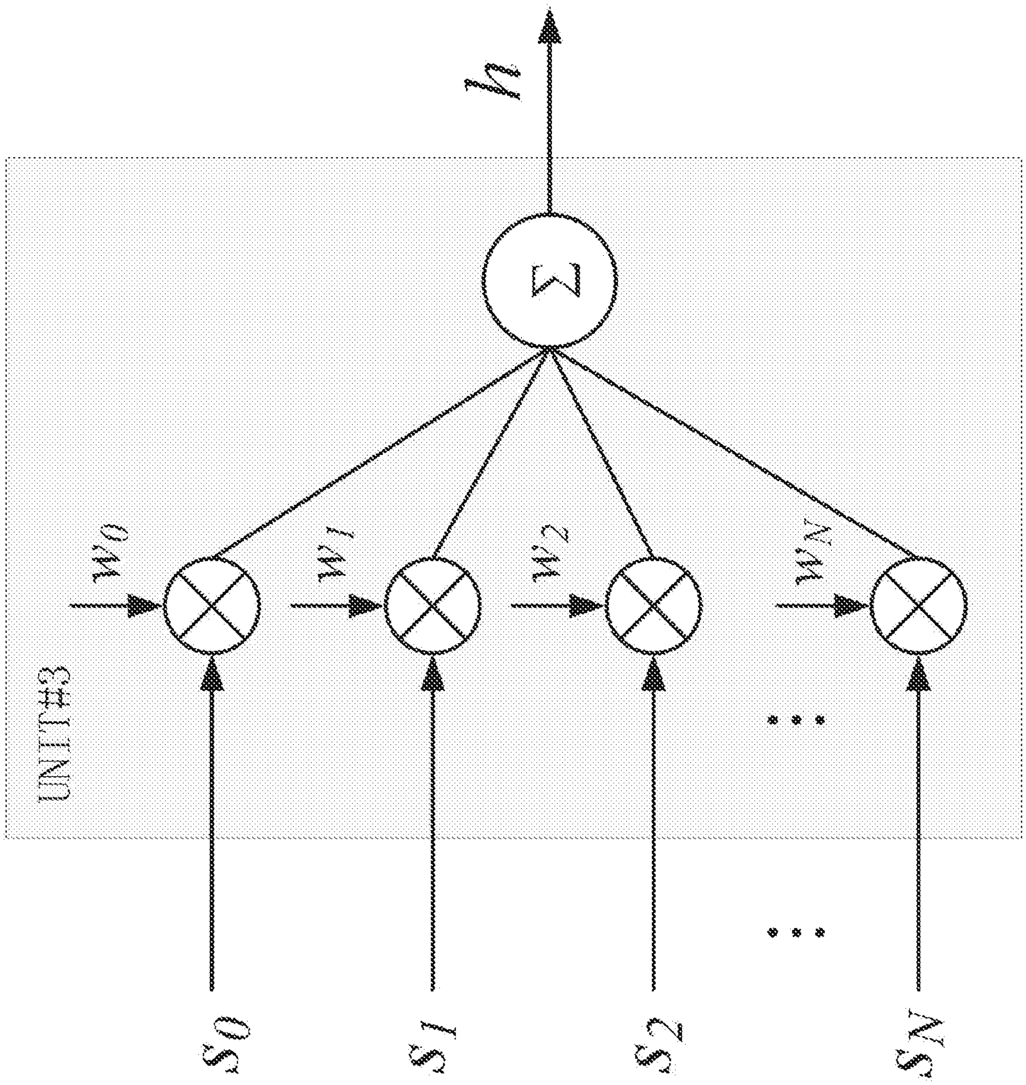
FIG. 9 shows an example implementation of a portion of a DPD function.

An optional structure for compute unit #3 in case 1 is shown in FIG. 9.

1) The output of unit #1 is $s_0, s_1, \ldots, s_N$.
2) Parameters of unit #3 are represented by $w_0, w_1, \ldots, w_N$, which need to be calculated, and is a complex number.
3) The input-output relationship of the module is:

$$h(n) = \sum_{i=0}^{N} s_i w_i.$$

Example Embodiment 7 (Case 7)

Figure 10:
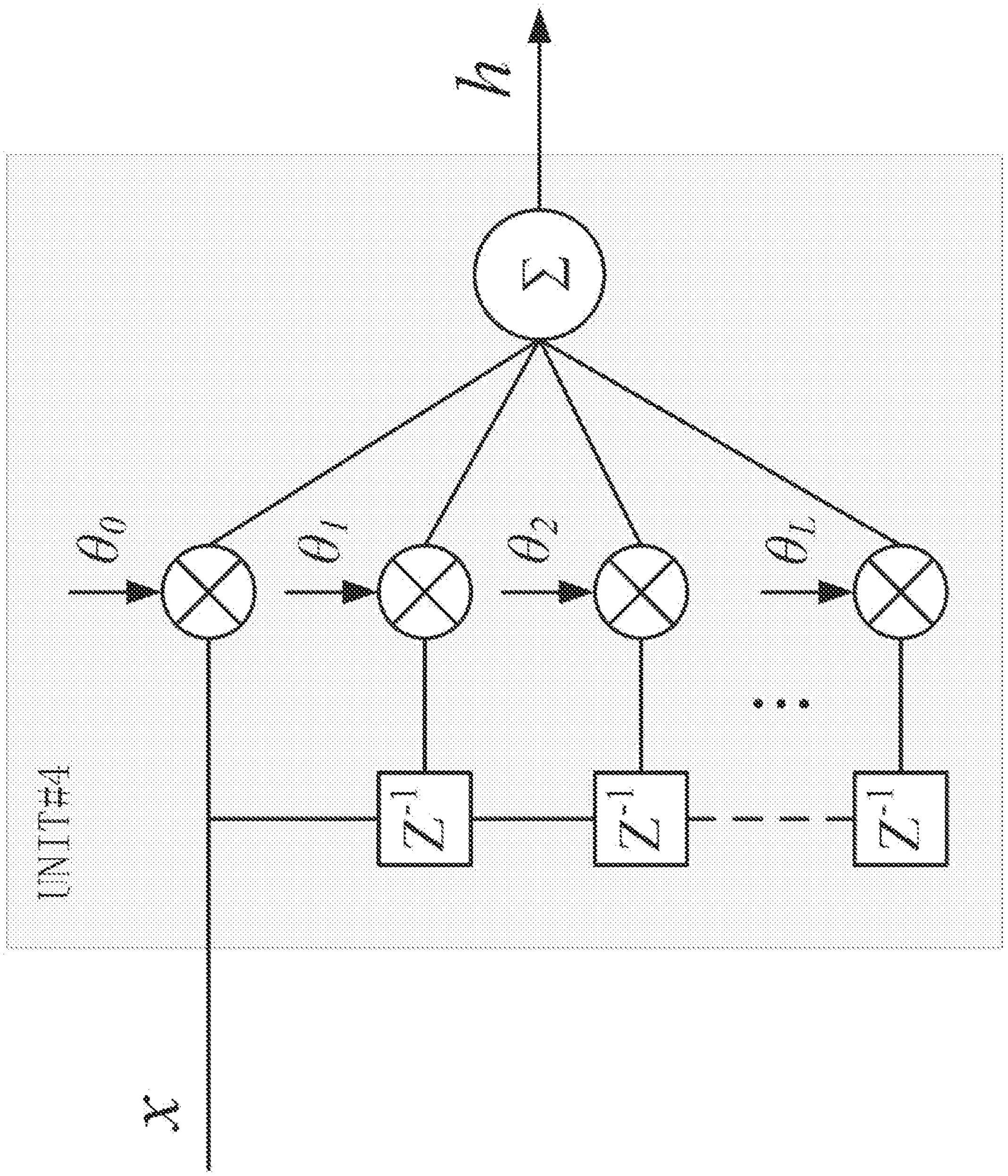
FIG. 10 shows an example implementation of a portion of a DPD function.

An optional structure of calculation unit #4 in case 2 is shown in FIG. 10.

1) $\theta_0, \theta_1, \ldots, \theta_L$ is the parameter of unit #4, which needs to be calculated, and is a complex number;
2) the input-output relationship of the module is $$h(n) = \sum_{i=0}^{N} \theta_i x(n-i).$$

Example Embodiment 8 (Case 8)

The DPD model examples disclosed herein are used for simulation comparison with the DPD model shown in FIG. 2 and FIG. 3. The simulations use two different power amplifiers, power amplifier A and power amplifier B. The sampling rate of power amplifier A is 200 MHz, and we use a 20 M bandwidth OFDM signal to test its DPD performance. The sampling rate of power amplifier B is 983.04 MHz, and we use a 100 M bandwidth OFDM Signal to test its DPD performance.

Simulation parameter settings are shown in Table 1.

TABLE 1

| Parameter | Value |
|---|---|
| DPD Architecture | Indirect architecture |
| Number of iterations | 10 |
| Number of epochs per iteration | 100 |
| optimizer | N_Adam |
| BatchSize | 128 |
| Activation function | Split-tanh |

The simulation result of power amplifier A is as shown in Table 2.

TABLE 2

| model | Number of parameters | NMSE[dB] | ACLR_L[dB] | ACLR_R[dB] |
|---|---|---|---|---|
| FIG. 2 model | 1045 | −39.9965 | 48.7859 | 49.2691 |
| FIG. 3 model | 1162 | −35.4342 | 43.0096 | 45.5133 |
| Case 1 model | 1173 | −40.1794 | 49.1467 | 49.7014 |

The simulation result of power amplifier B is as shown in Table 3:

TABLE 3

| Model | Number of parameters | NMSE[dB] | ACLR_L[dB] | ACLR_R[dB] |
|---|---|---|---|---|
| FIG. 2 model | 1045 | −50.4907 | 57.4528 | 57.7424 |
| FIG. 3 model | 1162 | −54.4857 | 61.0905 | 61.0181 |
| Case 1 model | 1173 | −55.4199 | 62.0342 | 62.2386 |

In the above tables, NMSE represents normalized mean square error and ACLR represents adjacent channel leakage with "L" and "R" representing left and right adjacent channels.

Comparing the simulation results of power amplifier A and power amplifier B, it can be seen that the performance of the DPD model in FIG. 2 for power amplifier A is better than the model in FIG. 3, and the performance of the DPD model in FIG. 3 for power amplifier B is better than that in FIG. 2. The adaptability of the DPD model mentioned at the beginning, the models in FIG. 2 and FIG. 3 only match a certain type of power amplifier.

Comparing the DPD model proposed by the present document, no matter for power amplifier A and power amplifier B, the DPD model proposed by the present document only has a small increase in parameters, and the performance is excellent for both power amplifiers. This shows that, compared with the models in FIG. 2 and FIG. 3, the proposed scheme has ubiquitous applicability across many different power amplifier non-linearity behaviors. The DPD model proposed by the present document thus is a better model in terms of performance and applicability.

Figure 12:
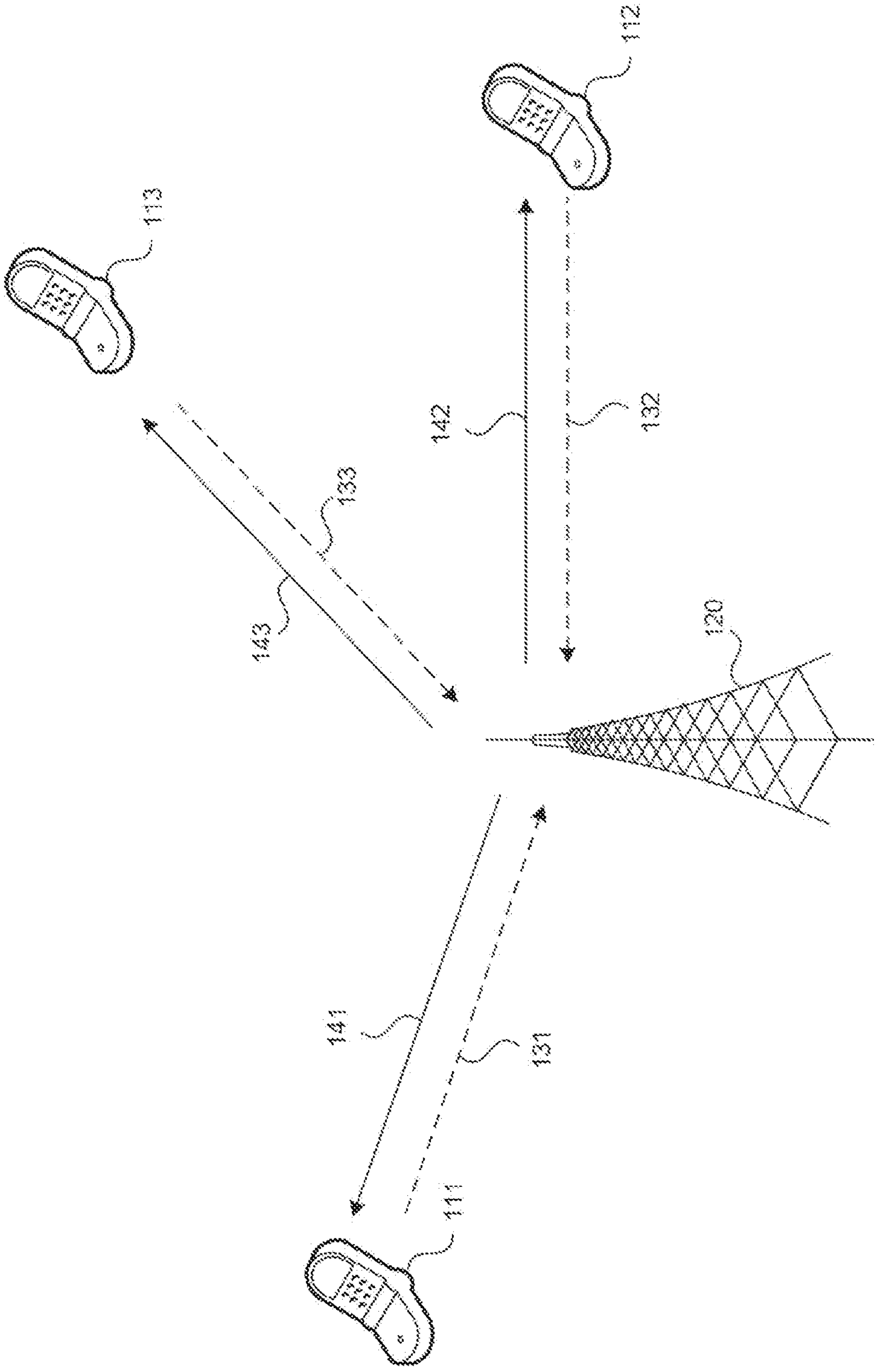
FIG. 12 shows an example wireless communication system.

FIG. 12 shows an example of a wireless communication system (e.g., a long term evolution (LTE), 5G or NR cellular network, or next generation networks beyond 5G, such as 6th generation networks) that includes a base station (BS) 120 and one or more user equipment (UE) 111, 112 and 113. The base station, which is a network device, may be implemented on land (e.g., a cell tower) or in the air (e.g., a satellite or an aerial vehicle). In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on. The DPD techniques disclosed in the present document may be implemented by a base station or a UE when generating transmission waveforms that are transmitted over the medium. It is noted that although the various embodiments are described with reference to "wireless" communication, the disclosed techniques may also be used for digital-predistortion in wired networks such as those using copper wire, coaxial cable, fiber optics, and the like.

Figure 13:
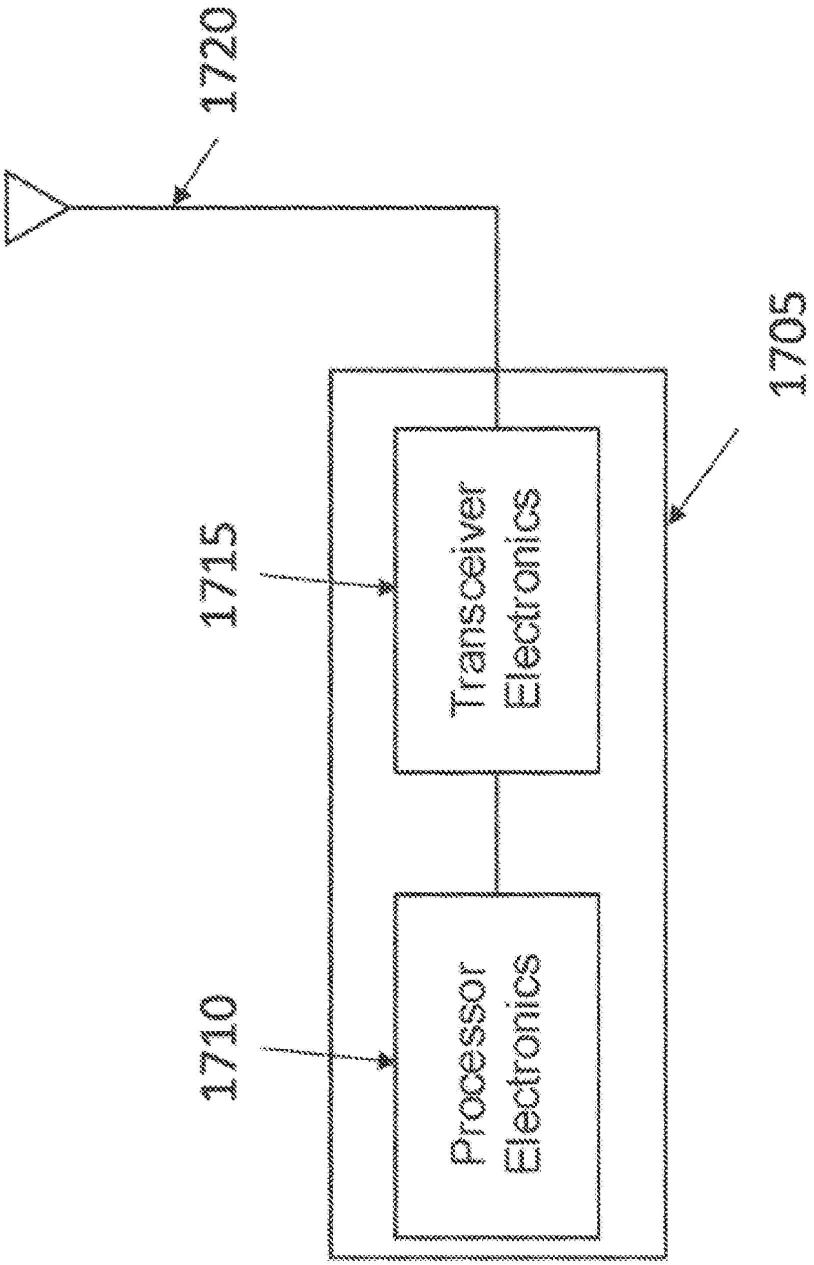
FIG. 13 depicts an example hardware platform.

FIG. 13 is a block diagram representation of a portion of an apparatus, in accordance with some embodiments of the presently disclosed technology. An apparatus 1705 such as a network device or a base station or a wireless device (or UE), can include processor electronics 1710 such as a microprocessor that implements one or more of the techniques presented in this document. The apparatus 1705 can include transceiver electronics 1715 to send and/or receive wireless signals over one or more communication interfaces such as antenna(s) 1720. The apparatus 1705 can include other communication interfaces for transmitting and receiving data. Apparatus 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the apparatus 1705, e.g., as a part of the transceiver electronics 1715 under control of the processor electronics 1710.

Some embodiments may preferably implement the following solutions.

Figure 14:
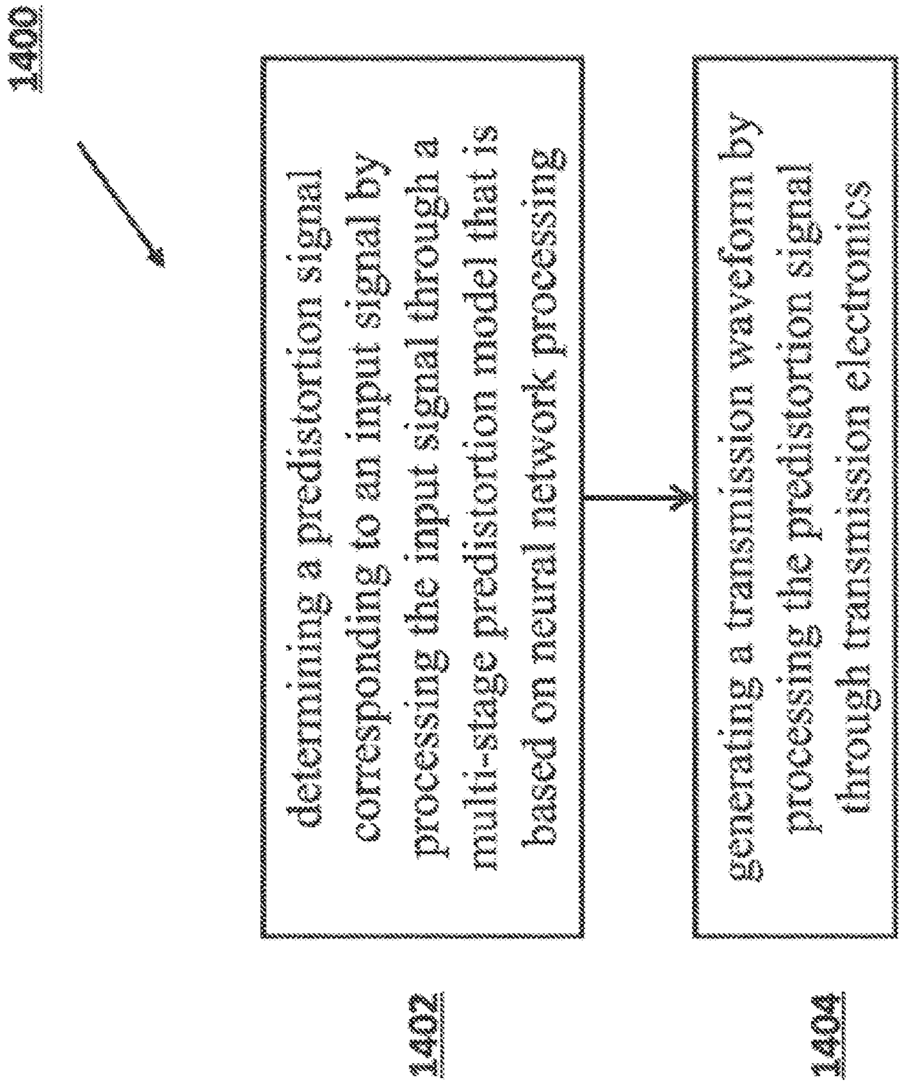
FIG. 14 is a flowchart for an example method of signal processing.

1. A method of processing signals (e.g., method 1400 depicted in FIG. 14), comprising determining (1402) a predistortion signal corresponding to an input signal by processing the input signal through a multi-stage predistortion model that is based on neural network processing; and generating (1404) a transmission waveform by processing the predistortion signal through transmission electronics. FIGS. 3 to 10 describe various embodiments of the method 1400.
2. The method of solution 1, wherein the processing the input signal through the multi-stage predistortion model comprises: generating N+1 output signals from the input signal by processing through a first unit, where N is a positive integer; generating a first intermediate signal by processing the input signal and the N+1 output signals through a second unit; generating a second intermediate signal by processing the N+1 output signals through a third unit; and combining the first intermediate signal with the second intermediate signal to determine the predistortion signal.
3. The method of solution 1, wherein the processing the input signal through the multi-stage predistortion model comprises: generating N+1 output signals from the input signal by processing through a first unit, where N is a positive integer; generating a first intermediate signal by processing the input signal and the N+1 output signals through a second unit; generating a second intermediate signal by processing the N+1 output signals through a third unit; generating a third intermediate signal by processing the input signal through a fourth unit; and combining the first intermediate signal, the second intermediate signal and the third intermediate signal to determine the predistortion signal.
4. The method of any of solutions 2-3, wherein the generating N+1 output signals from the input signal by processing through the first unit comprises generating the N+1 output signals as output of one or more neural networks that operates on the input signal and one or more previous values of the input signal and a modulo of the input signal and one or more previous values of the modulo of the input signal, wherein the one or more neural networks include at least one hidden layer and wherein the hidden layer uses a pre-defined activation function.
5. The method of any of solutions 2-3, wherein the generating N+1 output signals from the input signal by processing through the first unit comprises generating the N+1 output signals as output of one or more real number neural networks that operates on a real part of the input signal and one or more previous values of the real part of input signal, an imaginary part of the input signal and one or more previous value of the imaginary part of the input signal and a modulo of the input signal and one or more previous values of the modulo of the input signal, wherein the one or more real number neural networks include at least one hidden layer and wherein the hidden layer uses a pre-defined activation function.
6. The method of any of solutions 2-5, wherein the generating the first intermediate signal by processing the input signal and the N+1 output signals through the second unit comprises: generating the first intermediate signal by multiplicatively combining the input signal and N delayed versions of the input signal with the N+1 output signals.
7. The method of any of solutions 2-6, wherein the generating the second intermediate signal by processing the N+1 output signals through the third unit comprises:

generating the second intermediate signal by multiplicatively combining the N+1 output signals with a first weight vector.

8. The method of any of solutions 3-7, wherein the generating the third intermediate signal by processing the input signal through the fourth unit comprises: generating the third intermediate signal by multiplicatively combining the input signal and L delayed versions of the input signal with a second weight vector, where L is a positive integer.
9. The method of any of solutions 3-8, wherein the first unit, the second unit, the third unit, and the fourth unit comprise a neural network having at least one hidden layer.

10. The method of solution 9, wherein the at least one hidden layer is configured to use a split hyperbolic tangent activation function or a hyperbolic tangent activation function.
11. The method of any of solutions 1-10, wherein the input signal and the predistortion signal comprise complex values.
12. An apparatus for wireless communication comprising a processor configured to implement a method recited in any of solutions 1-11.
13. A computer readable medium having code stored thereon, the code when executed by a processor, causing the processor to implement a method recited in any of solutions 1-11.

It will be appreciated that the present document discloses novel digital pre-distortion techniques that combine multiple machine learning models (e.g., neural networks) in a configuration that enables the totality of DPD system to learn and compensate for non-linearity properties of any power amplifier. In one advantageous aspect, the multiple models are trained based on different inputs (e.g., complex signal values or real signal values), using different activation functions (e.g., hyperbolic tangent activation function, or rectified real unit function or a sigmoid function) that provide different levels of sensitivity to non-linearities being learned and corrected.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

The invention claimed is:

1. A method of processing signals, comprising:
determining a predistortion signal corresponding to an input signal by processing the input signal through a multi-stage predistortion model that is based on neural network processing; and
generating a transmission waveform by processing the predistortion signal through transmission electronics;
wherein the processing the input signal through the multi-stage predistortion model comprises:
generating N+1 output signals from the input signal by processing through a first unit, where N is a positive integer;
generating a first intermediate signal by processing the input signal and the N+1 output signals through a second unit;
generating a second intermediate signal by processing the N+1 output signals through a third unit; and
combining the first intermediate signal with the second intermediate signal to determine the predistortion signal.

2. The method of claim 1, wherein the generating N+1 output signals from the input signal by processing through the first unit comprises:
generating the N+1 output signals as output of one or more neural networks that operates on the input signal and one or more previous values of the input signal and a modulo of the input signal and one or more previous values of the modulo of the input signal, wherein the one or more neural networks include at least one hidden layer and wherein the hidden layer uses a pre-defined activation function.

3. The method of claim 1, wherein the generating N+1 output signals from the input signal by processing through the first unit comprises:
generating the N+1 output signals as output of one or more real number neural networks that operates on a real part of the input signal and one or more previous values of the real part of input signal, an imaginary part of the input signal and one or more previous values of the imaginary part of the input signal and a modulo of the input signal and one or more previous values of the modulo of the input signal, wherein the one or more real number neural networks include at least one hidden layer and wherein the hidden layer uses a pre-defined activation function.

4. The method of claim 1, wherein the generating the first intermediate signal by processing the input signal and the N+1 output signals through the second unit comprises:

generating the first intermediate signal by multiplicatively combining the input signal and N delayed versions of the input signal with the N+1 output signals.

5. The method of claim 1, wherein the generating the second intermediate signal by processing the N+1 output signals through the third unit comprises:

generating the second intermediate signal by multiplicatively combining the N+1 output signals with a first weight vector.

6. The method of claim 1, wherein the input signal and the predistortion signal comprise complex values.

7. A non-transitory computer readable medium having code stored thereon, the code when executed by a processor, causing the processor to implement the method of claim 1.

8. The method of claim 1, wherein the first unit, the second unit, and the third unit comprise a neural network having at least one hidden layer.

9. The method of claim 8, wherein the at least one hidden layer is configured to use a split hyperbolic tangent activation function or a hyperbolic tangent activation function.

10. A method of processing signals, comprising:

determining a predistortion signal corresponding to an input signal by processing the input signal through a multi-stage predistortion model that is based on neural network processing; and generating a transmission waveform by processing the predistortion signal through transmission electronics;

wherein the processing the input signal through the multi-stage predistortion model comprises:

generating N+1 output signals from the input signal by processing through a first unit, where N is a positive integer;

generating a first intermediate signal by processing the input signal and the N+1 output signals through a second unit;

generating a second intermediate signal by processing the N+1 output signals through a third unit;

generating a third intermediate signal by processing the input signal through a fourth unit; and combining the first intermediate signal, the second intermediate signal and the third intermediate signal to determine the predistortion signal.

11. The method of claim 10, wherein the first unit, the second unit, the third unit, and the fourth unit comprise a neural network having at least one hidden layer.

12. The method of claim 11, wherein the at least one hidden layer is configured to use a split hyperbolic tangent activation function or a hyperbolic tangent activation function.

13. The method of claim 10, wherein the generating N+1 output signals from the input signal by processing through the first unit comprises:

generating the N+1 output signals as output of one or more neural networks that operates on the input signal and one or more previous values of the input signal and a modulo of the input signal and one or more previous values of the modulo of the input signal, wherein the one or more neural networks include at least one hidden layer and wherein the hidden layer uses a pre-defined activation function.

14. The method of claim 10, wherein the generating N+1 output signals from the input signal by processing through the first unit comprises:

generating the N+1 output signals as output of one or more real number neural networks that operates on a real part of the input signal and one or more previous values of the real part of input signal, an imaginary part of the input signal and one or more previous values of the imaginary part of the input signal and a modulo of the input signal and one or more previous values of the modulo of the input signal, wherein the one or more real number neural networks include at least one hidden layer and wherein the hidden layer uses a pre-defined activation function.

15. The method of claim 10, wherein the generating the first intermediate signal by processing the input signal and the N+1 output signals through the second unit comprises:

generating the first intermediate signal by multiplicatively combining the input signal and N delayed versions of the input signal with the N+1 output signals.

16. The method of claim 10, wherein the generating the second intermediate signal by processing the N+1 output signals through the third unit comprises:

generating the second intermediate signal by multiplicatively combining the N+1 output signals with a first weight vector.

17. The method of claim 16, wherein the generating the third intermediate signal by processing the input signal through the fourth unit comprises:

generating the third intermediate signal by multiplicatively combining the input signal and L delayed versions of the input signal with a second weight vector, where L is a positive integer.

18. A non-transitory computer readable medium having code stored thereon, the code when executed by a processor, causing the processor to implement the method of claim 10.

19. An apparatus for wireless communication comprising:

a processor configured to:

determine a predistortion signal corresponding to an input signal by processing the input signal through a multi-stage predistortion model that is based on neural network processing; and generate a transmission waveform by processing the predistortion signal through transmission electronics;

wherein to determine the predistortion signal, the processor is configured to:

generate N+1 output signals from the input signal by processing through a first unit, where N is a positive integer;

generate a first intermediate signal by processing the input signal and the N+1 output signals through a second unit;

generate a second intermediate signal by processing the N+1 output signals through a third unit; and combine the first intermediate signal with the second intermediate signal to determine the predistortion signal.

* * * * *